May 25, 1965 G. B. ERSKINE ET AL 3,184,947
STUD FORMING AND TRANSFER MECHANISMS
Original Filed Oct. 3, 1957 6 Sheets-Sheet 6

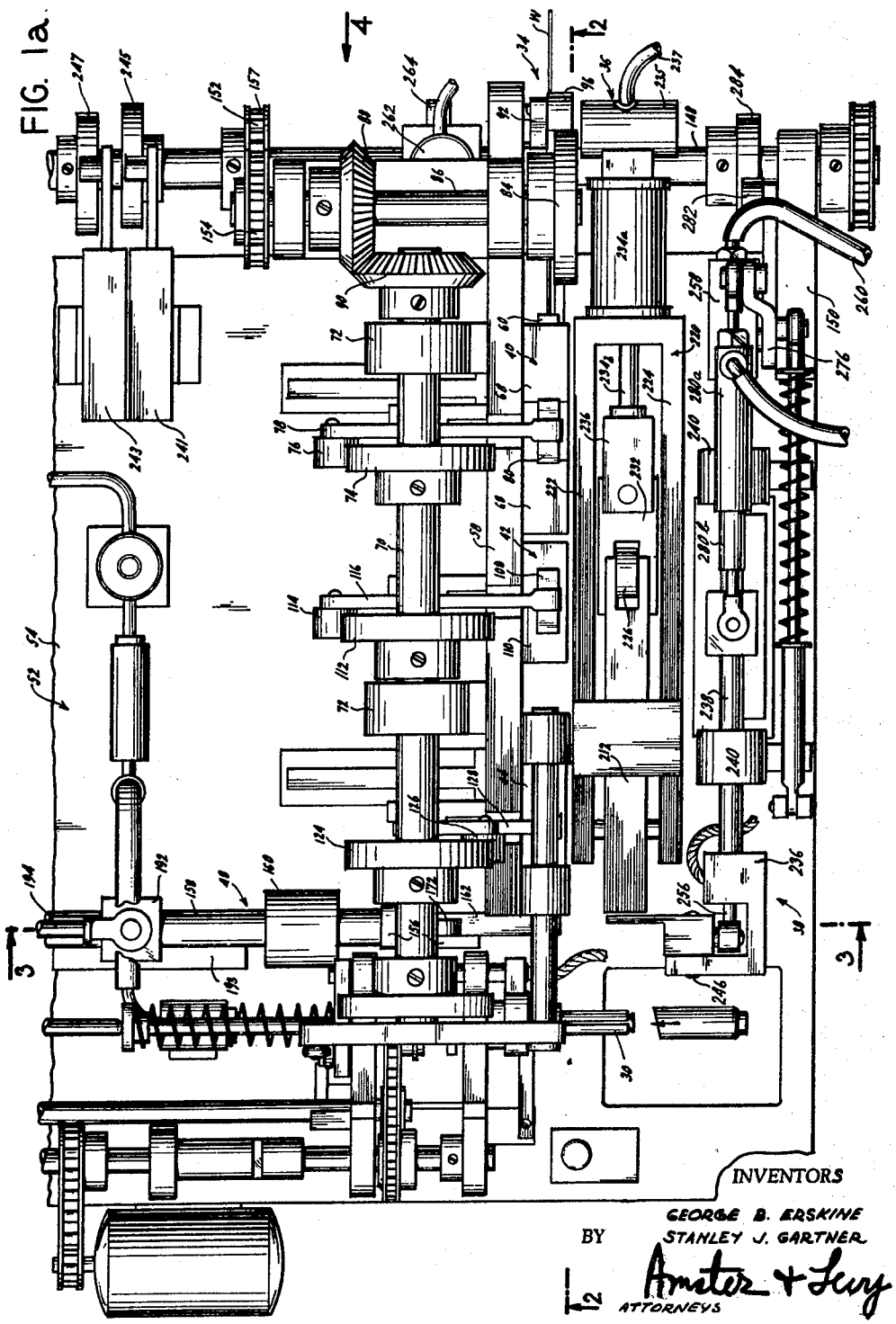

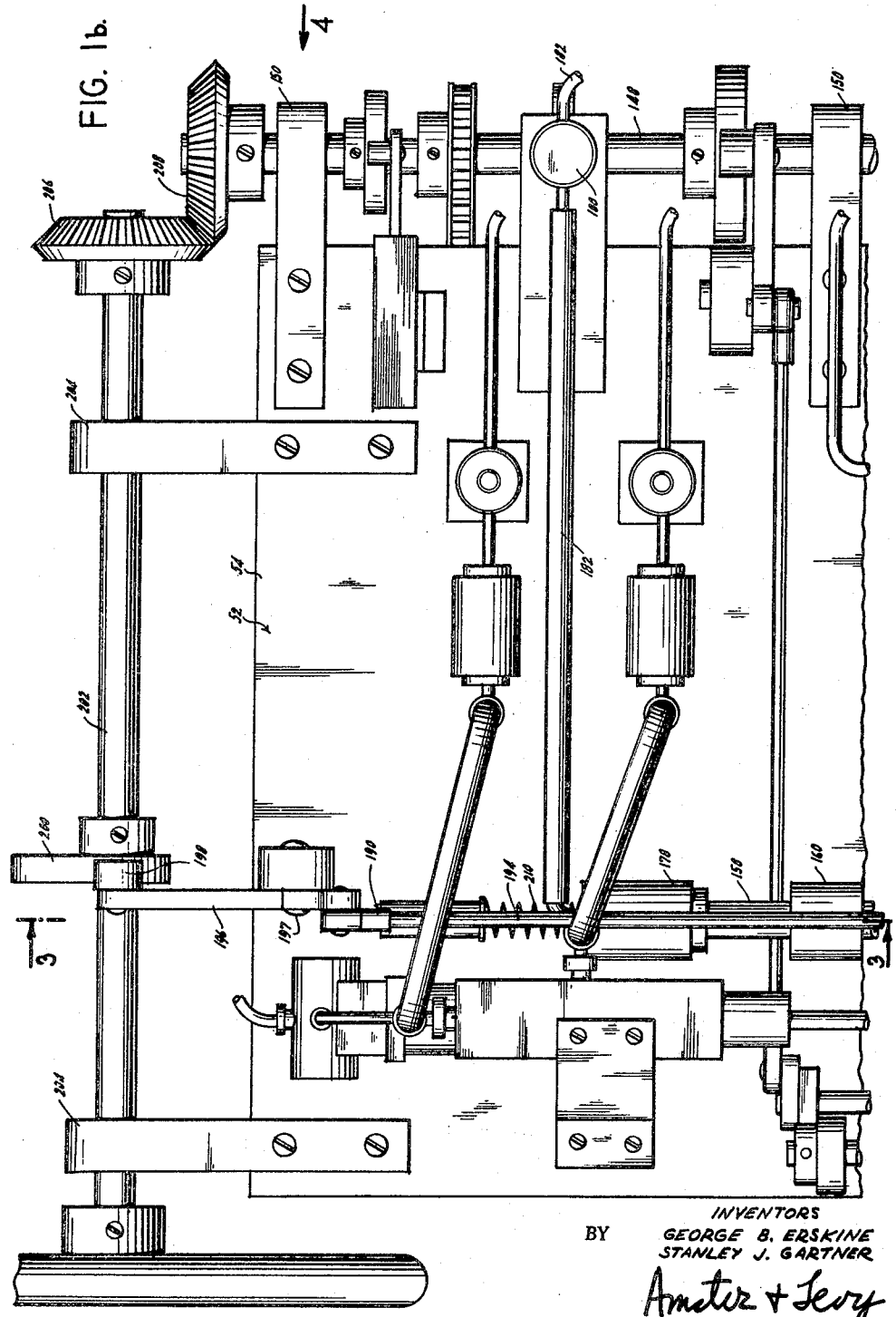

INVENTOR.
GEORGE B. ERSKINE
STANLEY J. GARTNER
BY
Ametz + Levy
ATTORNEYS

United States Patent Office 3,184,947
Patented May 25, 1965

3,184,947
STUD FORMING AND TRANSFER MECHANISMS
George B. Erskine and Stanley J. Gartner, Emporium, Pa.,
assignors to Emporium Specialties Co., Inc., Emporium,
Pa., a corporation of Pennsylvania
Original application Oct. 3, 1957, Ser. No. 687,913, now
Patent No. 2,951,933, dated Sept. 6, 1960. Divided and
this application Jan. 22, 1960, Ser. No. 4,119
1 Claim. (Cl. 72—294)

The present invention relates to an improved machine for the manufacture of studded electrodes, and in particular to an improved stud forming mechanism in an automatic machine for mounting such studs in a radially-extending, circumferentially spaced relation on an electrode body. This is a division of our co-pending application Serial No. 687,913, filed on October 3, 1957 entitled, Improved Machine and Method for the Manufacture of Studded Electrodes, now U.S. Patent No. 2,951,933.

In the electron gun assembly of a wide variety of cathode ray tube devices, such as television picture tubes, it is necessary to employ a series of electrodes maintained at prescribed operating potentials to form, focus and direct the electron beam. Such electrodes usually take the form of cup-like or sleeve-like electrode bodies each having a number of radially-extending mounting studs or pins welded to their outer peripheries at circumferentially-spaced locations. The studs or pins are usually disposed in groups spaced axially of the electrode body and provide a means by which the electrodes can be mounted in the neck section of the tube envelope. The mounting of the electrodes in the tube envelope is usually achieved by embedding flattened or swaged terminal portions of the studs in supporting rods of glass or similar thermoplastic material which serve to mount the several electrodes in the required orientation relative to each other and to the remaining components of the electron gun assembly.

It has been the general practice in the industry to construct these and other similar types of electrodes by a series of manual operations involving the use of assembly jigs and fixtures. To illustrate a typical hand assembly operation, the electrode body is supported on a jig and successive studs or pins are manually assembled with the electrode body, frequently by the use of an appropriate jig or fixture, and thereafter welded to the surface of the electrode body with the aid of a conventional bench welder. This hand method, by its very nature, is time consuming, tedious, painstaking, and necessitates multiple handlings of the studs and electrode bodies incident to achieving the final assembly. Usually, the studs are made in a first and separate operation, brought to the bench welder, and thereafter assembled as previously described. Apart from the problems attendant to the hand method of manufacture, the final electrode is frequently unsatisfactory in quality and often does not come up to accepted commercial standard. For most applications, it is essential that the mounting studs be precisely located both circumferentially and axially of the electrode body. The difficulty in obtaining a precision assembly within the prescribed tolerances established by the industry may be appreciated by considering a typical electrode which incorporates two groups of spaced studs each consisting of three studs spaced circumferentially at 120° intervals. Not only is it necessary to maintain close tolerance in the spacing of the studs in the respective groups, but it is also necessary to maintain accurate spacing and alignment between the groups. The overall problem is further complicated by the necessity of having very strong joints between the respective studs and the electrode body and by the inherent problems attendant to handling parts which are comparatively small in size, the mounting studs often being as small as one quarter of an inch in overall height.

It is broadly an object of the present invention to provide an improved method and machine for the manufacture of studded electrodes of the aforesaid type. Specifically, it is within the contemplation of the present invention to provide a highly versatile bench-type of automatic machine for forming studs and welding successive formed studs to a sleeve-like electrode body in a prescribed pattern. Specifically, it is an object of the present invention to provide a stud forming mechanism for a machine for the manufacture of studded electrodes.

It is the further object of the present invention to provide a cutting means to cut successive electrodes from a roll of wire and to provide transfer means to move successive electrodes from their cutting position to the next position in an automatic machine, in this case a swaging position.

A knowledge of the environment of the stud forming and transfer mechanism is useful for a full understanding of the present invention. Therefore, a brief description follows the method of manufacture of studded electrodes in an automatic machine in which the present invention is employed. In the contemplated machine, electrodes of the type including one or more radially-extending studs welded to an electrode body are manufactured by cutting off a length of wire to form a stud, transferring the stud to a swaging position, swaging the rearward end of the stud to form a flattened ear or terminal, bringing the forward end of the stud into contact with the electrode body with the stud extending radially of the body, and welding the stud to the body. Thereupon, the electrode body is axially rotated through a prescribed angular traverse corresponding to the desired circumferential spacing between the successive studs and the enumerated steps are repeated to form, swage, and weld a further stud to the body at a location circumferentially spaced from the first stud. The operation is repeated, if needed, to join one or more further studs to the electrode body. If the particular studded electrode is to embody a further row or group of radially-extending studs, the body is displaced axially through a distance corresponding to the desired spacing between the groups and the assembly steps are repeated to form, swage and weld one or more further studs to the body at circumferentially spaced locations displaced axially from the first group of studs.

An illustrative machine embodying features of the present invention for the manufacture of studded electrodes of the type including a cylindrical electrode body having a group of circumferentially-spaced, radially-extending studs welded thereto comprises a mandrel mounted for axial rotation and adapted to receive the electrode body to rotate the same whereby successive spaced locations about a circumferential path are brought into a welding position. Stud forming, swaging and transfer mechanisms are arranged to form swage and transfer successive studs into contact with the body as the spaced locations about the circumferential path are brought into the welding position. An indexing is operatively connected to the mandrel for indexing the same through a prescribed angular traverse in timed relation to operation of the stud forming and transfer mechanisms. Finally, appropriate means are provided for applying welding current to successive studs brought into the welding position. In the event that the cylindrical body is to include a further group of circumferentially-spaced, radially-extending studs welded thereto, the mandrel is mounted so that it may be displaced from its first position axially through a prescribed stroke to a second position wherein the mandrel can be indexed, as in the first instance, to bring spaced locations about the second circumferential path into a welding position to receive successive studs.

The present invention relates to the particular mechanisms which form successive studs from a length of wire and which transfer said studs to a swaging position. The cutting mechanism includes a feeder, a clamping device and a cutting die arranged along a wire feed path. The feeder has feed jaws which engage the wire and actuating means which move the jaws, and therefore the wire, through a prescribed stroke through the cutting die. At the end of each feed stroke the clamping device, actuated by jaw operating means holds the wire. Transfer means engages the prescribed section of wire while the cutting die cooperates with a stationary cutter to cut off a length of wire to form a stud. The transfer means then transports the studs to the swaging position.

The above brief description, as well as further objects, features, advantages and applications of the present invention will best be appreciated by reference to the following detailed description when taken in conjunction with the accompanying drawings wherein:

FIGS. 1a and 1b, which are to be placed side by side on the broken lines indicated at the respective margins to make up FIG. 1, is a plan view of a machine for the manufacture of studded electrodes embodying features of the present invention;

FIG. 5 shows the relative position of the feeding device, the clamping device, the cutting tools and the transfer jaws after feed of a length of wire into position for cutting;

FIG. 6 shows the relationship of the stud forming mechanism of FIG. 5 to the swaging and weld transfer mechanisms and the mandrel at the start of a stud forming cycle;

FIG. 7 is a view similar to FIG. 5 but showing the relation of the parts after cut-off of a length of wire corresponding to one stud; and FIG. 8 is a view similar to FIG. 6 showing a formed stud carried by the transfer mechanism to the swaging jaws and a swaged stud carried by the weld transfer device into contact with an electrode on the mandrel.

Preliminary to a detailed consideration of the present machine for the manufacture of studded electrodes, as shown specifically in FIGS. 1 to 4, inclusive, brief reference will be made to FIGS. 5 to 8 inclusive, for a general description of the function and operation of the several mechanisms incorporated into the present machine and their relationship to facilitate a more thorough understanding of the detailed description as the same proceeds.

Figure 8:
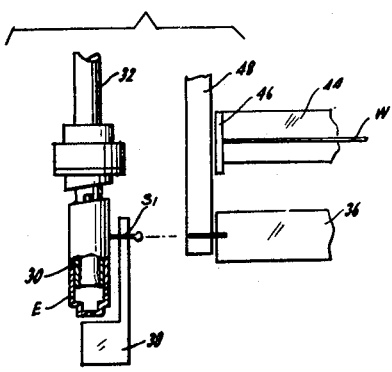

A typical studded electrode which may be manufactured in the present machine is shown in partially completed form in FIG. 8 and is generally designated by the letter E. Electrode E is illustrated as having one stud S attached thereto, it being understood that normally a plurality of studs are attached to the electrode E. The illustrative machine incorporates a mandrel 30 which is adapted to receive the electrode E and means including a supporting shaft 38 mounting the mandrel 30 for axial rotation to bring prescribed space locations about the circumference of the electrode body into a welding position.

Stud forming and transfer mechanisms, generally designated by the reference numerals 34, 48 (shown in detail in FIG. 2), are provided at a location laterally offset from the welding position P for cutting successive studs from a continuous length of wire W and for thereafter transferring the successive lengths of wire laterally to swaging mechanisms, generally designated by the reference numeral 36. The swaging mechanisms 36 are arranged to flatten the rearward ends of successive studs to provide ear-like projections or terminal positions $p$. Weld transfer mechanisms, generally designated by the reference numeral 38, are arranged to pick up successive swaged studs at the swaging mechanisms or station 36 and to transfer the same through an axial thrust at the weld position P toward and into contact with the electrode body $b$ supported on the mandrel 30.

The stud forming and transfer mechanisms 34, 48 include a feeder 40, a clamping device 42 and a movable cutting die 44 arranged along the wire feed path in succession, a stationary cutter 46 adapted to cooperate with the cutting die 44, and stud transfer jaws positioned to receive successive sections of cut-off wire for support and subsequent transfer to the swaging mechanisms 36.

Figure 5:
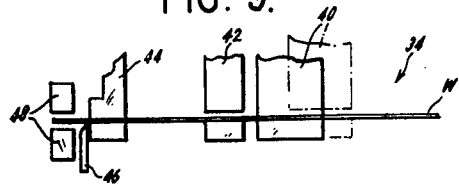
FIGS. 5, 6, 7 and 8 are diagrammatic showings of some of the essential operating mechanisms of the stud forming and transfer mechanisms in their related positions of movement during a sequence of operations for the formation of a studded electrode, to wit.
Figure 6:
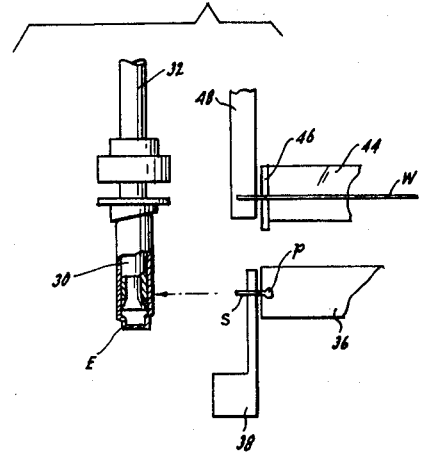
Figure 7:
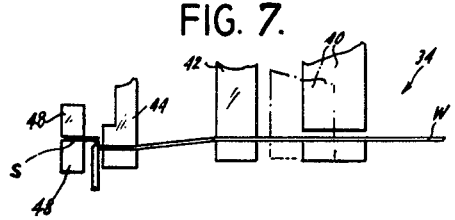

Further referring to FIGS. 5, 6, 7 and 8, when the machine is placed in operation, the feeding device 40 closes on the wire W at the dotted line position illustrated in FIG. 5, and then advances through a forward stroke to move a prescribed length of the wire through the movable cutting die 44 and into position to be engaged by the stud transfer jaws 48. The clamping device 42 closes to grip the wire W for cut-off and the transfer jaws 48 close on the stud forming section S to grip the same. As seen in FIG. 7, the cutting die 44 moves laterally relative to the stationary cutter 46 to cut off the prescribed sections of the wire W, and during this time the feeding device 40 is opened and returns to the retracted position (corresponding to the dotted showing in FIG. 5) for feed of the next length of wire into position for cut-off and transfer.

After the length of wire S is cut off, the closed stud transfer jaws 48 advance laterally through a prescribed stroke from the retracted position illustrated in FIG. 6, to the advanced position illustrated in FIG. 8, in which the rearward end of the stud S is engaged by the swaging mechanisms to form the flattened ear or projection $p$. When the stud transfer jaws 48 are in the advanced position of FIG. 8, the weld transfer jaws 38 are in position to hold the previously formed stud against the electrode body $b$ for the welding operation. The swaging mechanisms 36 include swaging jaws which close on the rear end of the stud while held by the stud transfer jaws 48. After the swaging operation is completed, the swaging jaws support the stud by its swaged end whereby the stud transfer jaws are able to retract and the weld transfer jaws 38 are able to move into the pickup position of FIG. 6.

Referring now to FIGS. 1 to 4 of the drawings, detailed reference will be made to the several coordinated mechanisms for forming studs and studding electrodes in accordance with the present invention. As seen in FIGS. 1 (FIGS. 1a and 1b) and 4, the machine includes a bench-like support 52 having a bed plate 54 supported on a number of depending legs 56. Extending from front to rear of the machine is an upstanding wall 58 which along with the bed plate 54 serves to support the various machine components. The numerals employed heretofore, in conjunction with FIGS. 5 to 8 to generally identify the various mechanisms, will be likewise employed in the following detailed description to identify such mechanisms.

Figure 2:
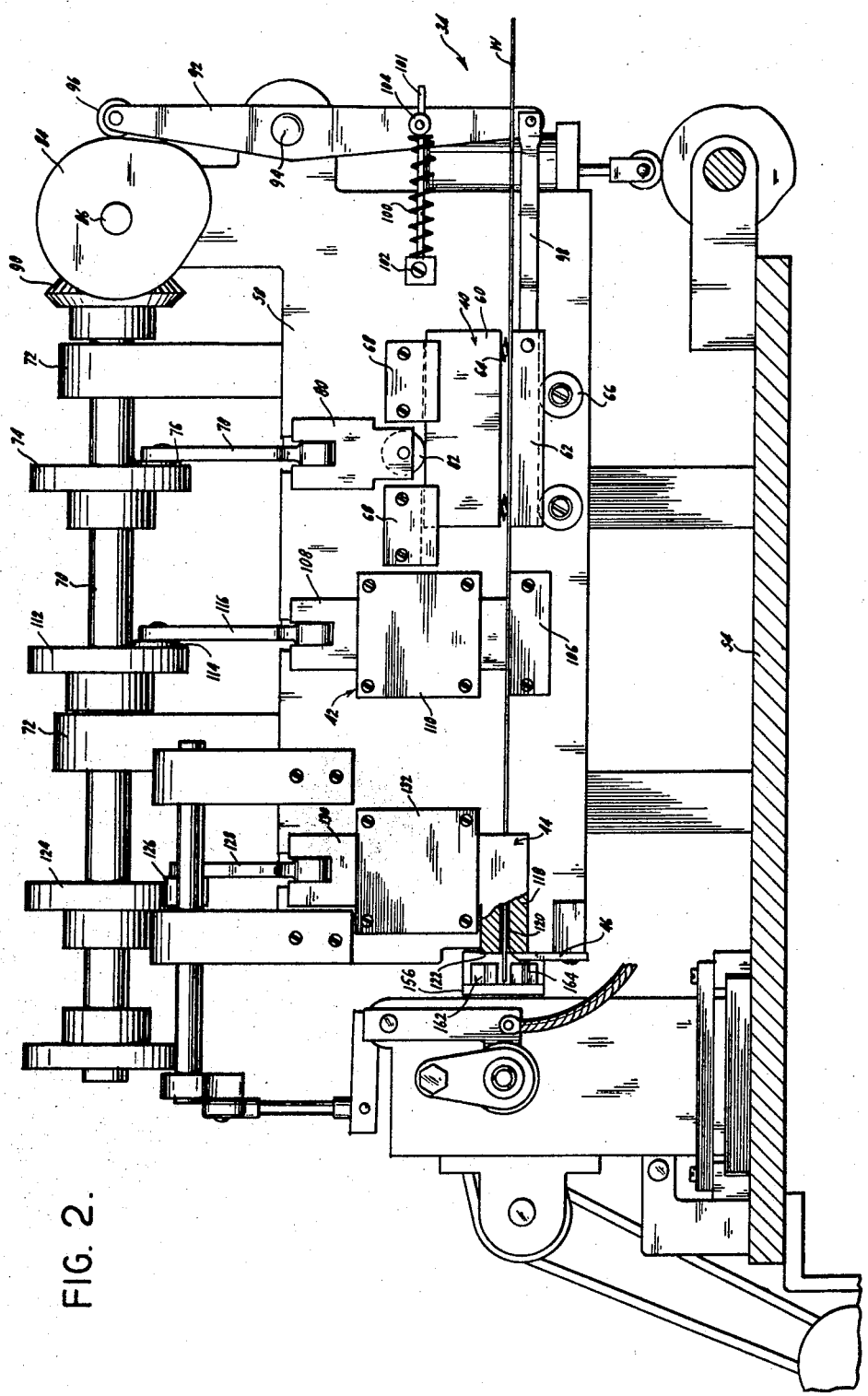
FIG. 2 is an elevational view, with parts broken away and sectioned, taken along the line 2—2 of FIG. 1 and looking in the direction of the arrows, showing the details of the wire feeding and stud forming and transfer mechanisms incorporated in the machine.

Referring now specifically to FIGS. 1 and 2, the stud forming and transfer mechanisms 34 are seen to be located along the upstanding wall 58 intermediate the wall 58 and the swaging mechanisms 36. The feeder 40, the clamping device 42 and the movable cutting die 44 are mounted one after another on the upstanding supporting wall 58 and act upon the stud wire W which is fed from a coil or similar supply (not shown), from right to left in FIG. 2, that is, from the rear of the machine toward the front thereof. The feeder is in the form of a laterally movable feeding head having upper and lower jaws 60, 62 mounted for movement as a unit through a predetermined stroke along the length of the wire W to feed a prescribed section S thereof beyond the forward end of the cutting die 44. The action of the feeding head 60, 62 is to close upon the wire W, feed through a forward stroke, open, and return to the starting position for feed of the next length of wire. Such action may be recognized as the familiar four-motion feeding. In the position illustrated in FIG. 2, the feeding head has completed the feed of a section of wire W, the jaws are open and the head has returned to its starting position. The upper feeding jaw 60 is mounted on the lower feeding jaw 62 by upstanding posts and is biased away from the lower feeding jaw 62 by one or more interposed springs 64. The feeding head 40 is mounted for its forward feeding motion and its return by roller supports 66 pivotally mounted on the wall 58 which engage within a track in the undersurface of the lower feeding jaw 62 and guide blocks 68 fixed to the wall 58 which are formed with a track receiving the upper end of the upper feeding jaw 60.

The feeder 40 is controlled and coordinated into the overall machine system from an auxiliary cam shaft 70 which is journaled on a number of appropriate bearings 72. The auxiliary cam shaft 70, which is driven from the main motor of the machine as will be subsequently described, controls both the opening and closing of the jaws 60, 62 of the feeding head 40 and the thrust and return of the feeding head. Specifically, the cam shaft 70 carries a jaw operating cam 74 which is engaged by a cam follower 76 pivotally carried on a cam follower arm 78. The cam follower arm 78 is pivotally connected to a bifurcated operating member 80 which is slidably supported on the uptanding supporting wall 58 and has a roller contact 82 with the upper jaw 60 of the feeding head intermediate the guide blocks 68. The development of the jaw operating cam 74 is selected to close the jaw 60 prior to the beginning of a feeding cycle and to open the jaw 60 at the end of the feeding cycle in appropriate time relation to the advance and return of the feeding head 40. The advance and return of the feeding head is achieved from a head actuating cam 84 which is coupled to the auxiliary cam shaft 70 and to the main drive. As seen in FIG. 1a, the cam 84 is disposed at right angles to the cam 74 and is supported on a coupling shaft 86 connected via meshing bevel gears 88, 90 to the main drive and to the auxiliary cam shaft 70. The head control cam 84 is connected to the feeding head 40 by a double-armed lever 92 which is pivoted at 94 on the supporting wall 58 and has a follower 96 at its upper end in engagement with the cam 84. The lower end of the double-armed lever 92 is pivotally connected via a coupling link 98 to the lower jaw 62 of the feeding head 40. The feeding head 40 is biased into its return or retracted position by a spring 100 supported on a rod 101 which is connected between a stationary abutment 102 on the supporting wall 58 and a further abutment 104 carried on the lower arm of the double-armed lever 92. The development of cam 84 is selected such that during each stud-forming cycle the double-armed lever 92 is rocked about its pivot 94 in the direction appropriate to thrust the coupling link 98 forward (to the left in FIG. 2) through a prescribed feeding stroke against the biasing effect of the spring 100. The length of stud wire fed from the supply during each stud forming cycle may be accurately controlled by appropriate coordination and development of the cams 74, 84, as is understood by those skilled in the art.

Next along the path of the advancing wire W is the clamping device 42 which is shown in the closed position in FIG. 2 preparatory to cut-off of a length of the stud forming wire. The clamping device 42 includes a lower stationary clamping jaw 106 fixed to the supporting wall 58 with its upper face in alignment with the upper face of the feeding jaw 62, and a movable clamping jaw 108 which is mounted for vertical reciprocation on the supporting wall 58 by appropriately formed guide block 110. The movable clamping jaw 108 is closed down on the wire W and against the stationary clamping jaw 106 at the appropriate time in the stud forming cycle by a cam 112 carried on the auxiliary cam shaft 70 and coupled to the movable clamping jaw 108 by a cam follower 114 carried on a cam follower arm 116 which is pivotally connected to the upper bifurcated end of the clamping jaw 108. Closing of the upper clamping jaw 108 provides an accurate stop which precludes axial displacement of the wire W prior to and during cut-off whereby the length of the stud may be accurately established and controlled.

Next along the wire feeding path is the movable cutting die 44 which includes a die body 118 having a bore 120 for the wire W. The bore is substantially in the plane of the upper faces of the jaw 62, 106. The bore 120 opens into a vertically-extending cutting face 122 which cooperates with the stationary cutter 46 to cut off the section of the wire advanced beyond the cutting face 122 in response to downward displacement of the movable cutting die 44. The cutting die 44 is moved downwardly through the prescribed cutting stroke under the control of a cutter operating cam 124 carried on the auxiliary cam shaft 70. The cam 124 is engaged by a follower 126 which is carried on a cam follower arm 128 pivotally connected to a bifurcated rigid extension 130 on the die body 118. The extension 130 is mounted for vertical reciprocation on the supporting wall 58 by an appropriately formed guide block 132. It will be appreciated that appropriate springs (not shown) are operatively connected to the respective cam follower arms 78, 116 and 128 to bias the followers against their associated cams.

Figure 4:
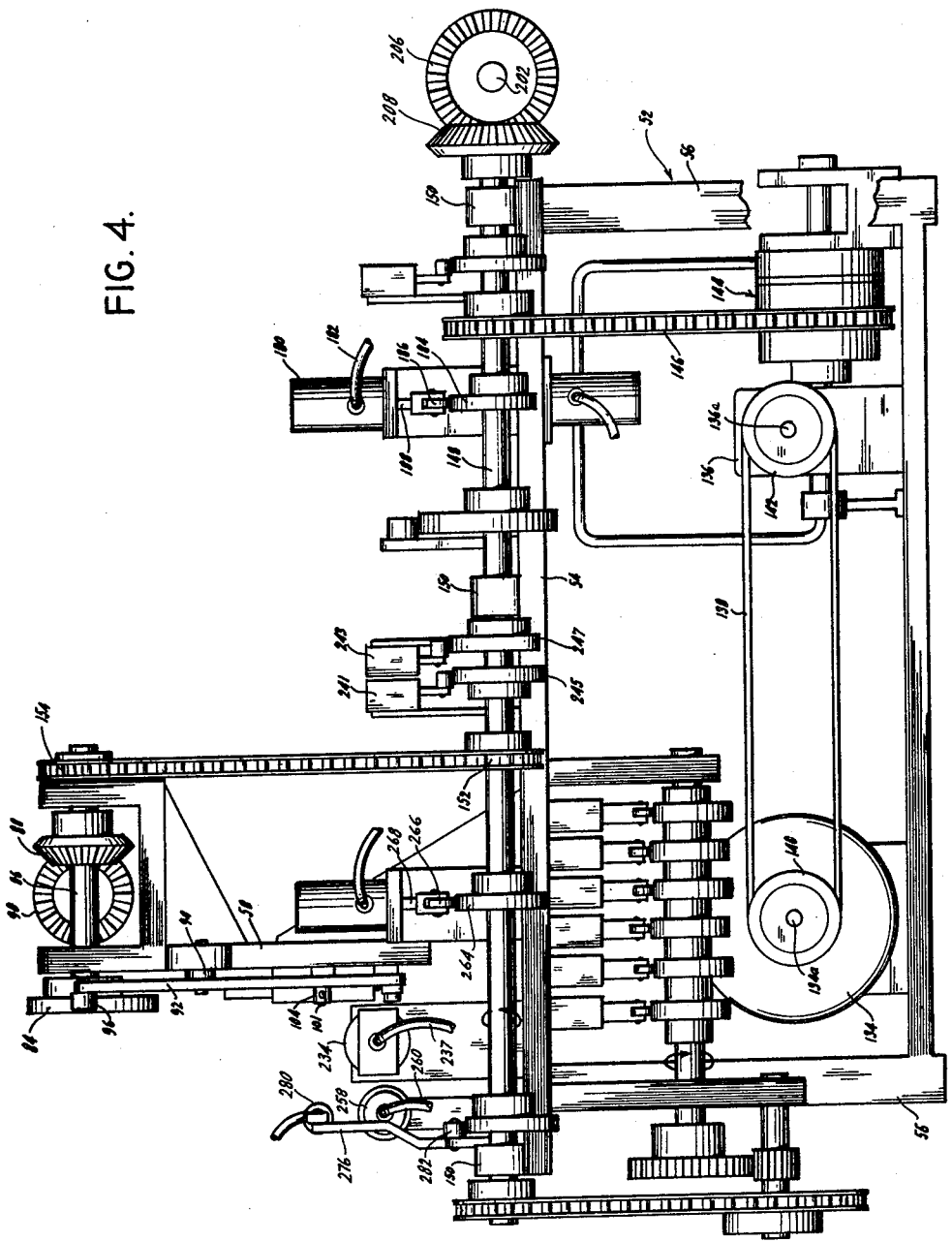
FIG. 4 is a rear elevational view of the machine, taken from the right of FIG. 1 and in the direction of the arrow 4.

Reference will now be made to FIGS. 1 and 4 for a description for the drive of the intermeshing beveled gears 88, 90 which rotate the auxiliary cam shaft 70 and the auxiliary coupling shaft 86 for the cams 74, 84, 116 and 124 of the stud forming mechanisms. As seen in FIG. 4, a main motor 134 is mounted beneath the bedplate 54 on the supporting frame 52 and has its output shaft 134a coupled to the input shaft 136a of a reduction gearing unit 136 via a belt 138 trained over the pulleys 140, 142 connected to the respective shafts 134a, 136a. The output shaft of the reduction gearing unit 136 is connected to a pneumatic brake and clutch, generally designated by the numeral 144, which has an output driving sprocket coupled to a chain 146 which is also trained about a driven sprocket carried on the main cam shaft 148. The main cam shaft 148 is journaled on the bedplate 54 by appropriate bearings 150 and is rotated once during each stud forming, transfer and welding cycle and coordinates many of the interrelated mechanisms which operate during such cycle. If for example six studs are to be welded to an electrode body, the shaft 148 will make one revolution for each sequence of operations required to form, transfer and weld one of the studs. Thus the main cam shaft 148 will make six revolutions from start to finish of the illustrated overall machine cycle. The main cam shaft 148 carries a driving sprocket 152 which is connected to a driven sprocket 154 on the coupling shaft 86 by a chain 157. As previously detailed, the coupling shaft 86 carries the bevel gear 88 which meshes with the bevel gear 90, thereby imparting drive to the auxiliary cam shaft 70 of the stud forming mechanisms.

Figure 3:
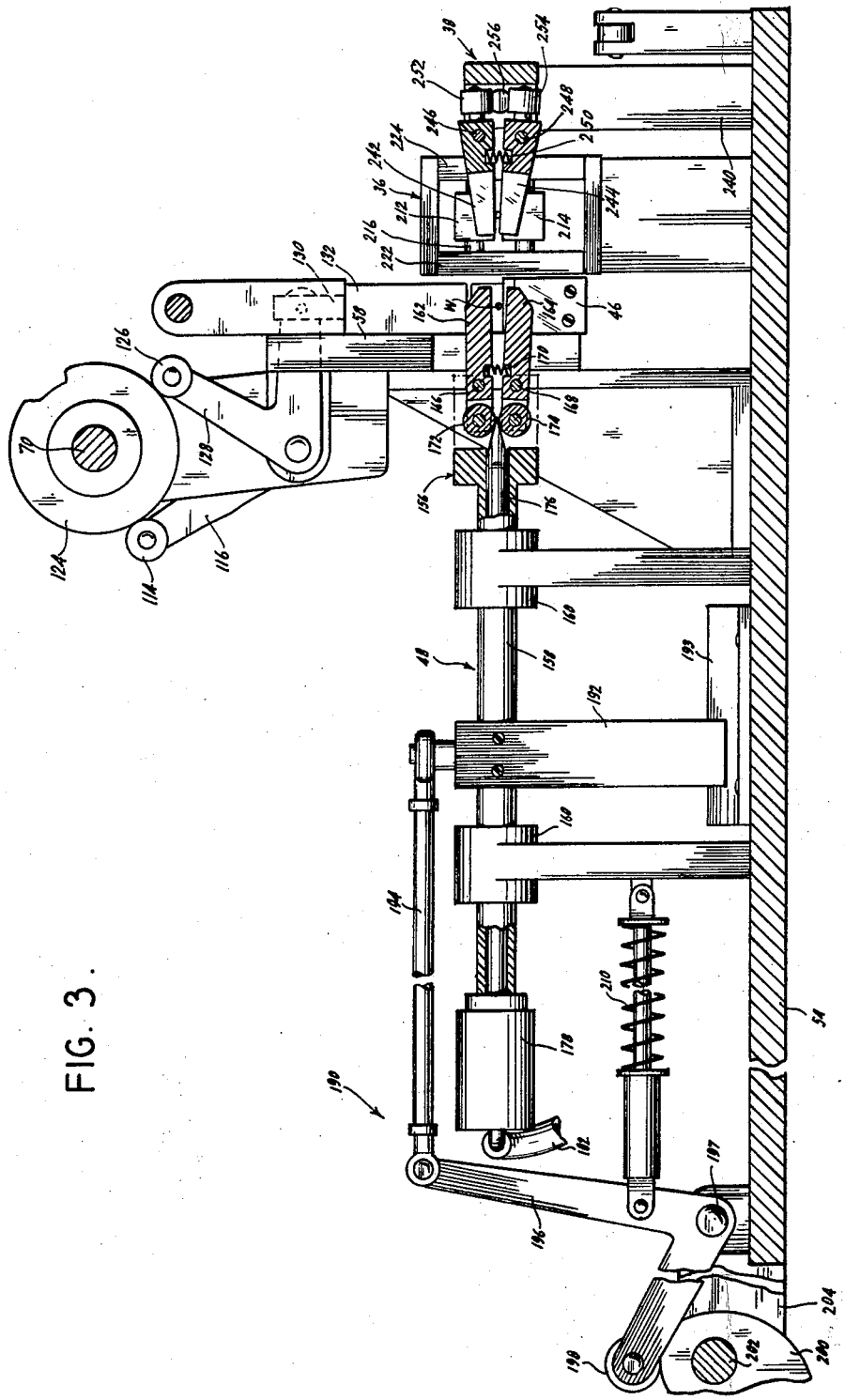
FIG. 3 is an elevational view with parts broken away and sectioned, taken substantially along the line 3—3 of FIG. 1 and looking in the direction of the arrows, showing the details of the stud transfer and weld transfer mechanisms.

Detailed reference will now be made to FIGS. 1 and 3 for a description of the stud transfer mechanisms 48 which incorporate stud transfer jaws arranged to support the successive lengths of the stud wire W fed through the cutting die 44 for cut-off and to laterally transfer successive studs into position for engagement and support by the swaging mechanisms 36 while along the thrust line or path P. The stud transfer mechanisms 48 include a stud transfer head 156 which is supported on the bed-plate 54 of the machine for lateral movement across the wire feed path through a transfer stroke. The stud transfer head 156 is carried on a hollow supporting shaft 158 which is journaled on bearings 160 carried by the bed-plate 54 of the machine. As seen in FIG. 3, the stud transfer head 156 includes a pair of stud transfer jaws 162, 164 which are mounted on the head at pivots 166, 168. The forwardly-extending stud-engaging portions of the jaws 162, 164 are biased apart by an interposed spring 170. Pivotally mounted on the rearward end of the jaws 162, 164 are respective jaw-closing rollers 172, 174 which are separated by a thrust member 176 slidable within the supporting shaft 158 and having divergent camming surfaces on its forward end. In response to movement of the thrust member 176 to the right in FIG. 3 through a prescribed stroke, the divergent camming surfaces are effective to urge the rollers 172, 174 apart, thereby closing the jaws 162, 164 on the length of stud wire against the reaction force of the spring 170. The thrust member 176 is driven through its prescribed stroke to cause the jaws 162, 164 to pick up successive lengths of wire at the wire cut-off location by a pneumatic control 178 incorporating an air cylinder and piston which is operated from a source of compressed air via valve 180 in the inlet conduit 182. The inlet conduit 182 is connected to the appropriate source of air under pressure in the normally employed manner, and the timed valving of the air to the piston and cylinder 178 is achieved via the air valve 180 which is opened and closed by a cam 184 on the main cam shaft 148. As seen in FIG. 4, the cam 184 is engaged by a follower 186 carried on a follower arm 188 which in turn controls the opening and closing of the air valve 180. The air valve 180 is of the type that is normally closed and is opened in response to an upward thrust imparted to the cam follower arm 188 as the rise portion of the cam 184 is presented to the cam follower 186.

Returning again to FIG. 3, after the stud transfer jaws 162, 164 close upon the cut-off lengths of stud wire W, the transfer head 156 moves through its required forward stroke under control of its actuating mechanisms, generally designated by the reference numeral 190. The transfer actuating mechanisms 190 include a coupling member 192 fixed to the shaft 158 and guidingly engaged at its lower end by a guide rail 193 on the bed-plate 54 such that the shaft 158, the head 156 and the pneumatic control 178 for the jaws may be advanced through the required stroke. The coupling member 192 is pivotally connected via an adjustable coupling 194 to a bellcrank 196 which in turn is pivoted on the bed-plate 54 at 197. The bell-crank 196 is rocked under the influence of a cam follower 198 which is journaled on one arm thereof and controlled by the cam 200 carried on the further auxiliary cam shaft 202. As seen best in FIG. 1, the cam shaft 202 is journaled at one end of the machine on appropriate bearings 204 and extends from the front to the rear of the machine frame 52. At the rear side of the machine, the auxiliary cam shaft 202 is coupled to the main cam shaft 148 by intermeshing bevel gears 206, 208 carried respectively on the shafts 202, 148. The cam follower 198 is urged into engagement with its transfer head operating cam 200 by provision of a coil spring 210 which tends to urge the bell-crank 196 in a counterclockwise direction about the pivot 197 (see FIG. 3). Advantageously, the coupling link 194 is made of adjustable length so that the initial position of the transfer head 156 may be adjusted, if required.

By way of brief review, the stud transfer jaws 162, 164 close upon the wire by the actuation of the thrust member 176; and when closed, the entire transfer head 156 moves from the wire pick-up location at the cutter 44, 46 to the transfer location at the swaging mechanisms 36. After the swaging mechanisms operate and support the stud, as now will be described, the stud transfer jaws 162, 164 open and the transfer head 156 retracts to the position for pick-up of the next cut-off length of wire.

Reference will now be made to FIGS. 1 and 3 for a general description of the swaging mechanism 36 and the weld transfer device 38 which are described in detail in our copending application Serial No. 687,913 filed on October 3, 1957, now U.S. Patent No. 2,951,933. The swaging mechanism includes a pair of swaging jaws 212, 214, seen in FIGS. 1 and 3 pivotally mounted on a bifurcated support 220 having opposite walls 222, 224. At the rearward end of the jaws 212, 214 are mounted rollers 226 on which is applied a large spreading force by the pneumatically driven spreading member 232. The power stroke of spreading member 232 spreads the rearward ends of the jaws 212, 214 thus closing the forward ends. A stud S, placed in the swaging position at jaws 212, 214 by the travel of the transfer mechanism 48 is thus swaged. The power stroke is imparted to the spreading member 232 by a pneumatic control 234 which includes a cylinder 234a and a piston shaft 234b connected via a yoke 236 to the spreading member 232. The cylinder is selectively posted by a two-way solenoid controlled valve 235 connected to the inlet conduit 237, 239. The valve is selectively energized by switches 241, 243 under control of the cam 245, 247. For the present purpose it suffices to point out that the swaging jaws 212, 214 close onto successive studs brought into the swaging position to swage the rearward portions of the studs and to hold the studs for pick-up by the weld transfer mechanisms 38.

The weld transfer mechanisms 38 pick up swaged studs from the swaging station by a pair of weld transfer jaws 242, 244 pivotally mounted at 246, 248, respectively. A spring 250 biases the jaws apart and is opposed by the action of a thrust member 256 acting against rollers 252, 254 mounted on the ends of the jaws 242, 244. The thrust member 256 is slidably received within a supporting shaft 238 which is in turn supported on bearings 240 which are mounted on the bed-plate 254. The thrust member is effective to clamp the jaws 242, 244 onto a stud S in response to a pneumatic control 238 which received air from conduit 260 via valve 262. Valve 262 is normally closed and is opened in response to cam 264 mounted on the main cam shaft 148 through cam follower 266 and cam follower arm 268. After a stud S has been swaged the jaws 242, 244 are closed upon it by the operation of the thrust member 256. The full weld transfer head 236 then is moved in a forwardly direction such that the stud is in contact with the electrode E mounted on the mandrel 30. The actuating mechanisms for this motion are governed by cam 284 on the main cam shaft 148 through follower 282, bell-crank lever 276 and then to a weld-timing and pressure piston and cylinder 280 which is effective to advance the supporting shaft 238 in a forwardly direction. Provision is made at weld transfer head for welding the stud S to the electrode E when in this forward position.

It will be appreciated from the fact that the various cam shafts 70, 86, 148 and 202 are mechanically linked as described, that the various operations described occur in a timed relation to one another. Specifically when the wire W is advanced by the feeder 40 under the influence of cam 84 the transfer jaws 162, 164 of the transfer mechanism 48 close on the stud S under the control of cam 184. The clamping device clamps on the wire W holding it from any movement by the action of cam 12. The cutting die then moves downwardly, controlled by cam 124, to cut off a stud S at which time the stud transfer means are operative to transfer a stud to the swaging station under the control of cam 200. While this transfer is going on the feeder 40, clamping device 42, and cutting die 44 are being returned to their starting positions to begin the cycle again. The swaging mechanism is then activated by cams 245, 247 after which the weld transfer jaws grasp the swaged stud S controlled by cam 264. The weld transfer head 236 is advanced to the electrode E by the action of the weld transfer actuating cam 284 and welding pressure is applied through the air cylinder 280 as controlled by cam 299.

A latitude of modification, change and substitution is intended in the foregoing disclosure and in some instances, some features of the invention will be used without a corresponding use of other features. Accordingly, it is appropriate that the appended claim be construed broadly and in a manner consistent with the scope and spirit of the contribution herein.

What we claim is:

In a machine for the manufacture of studded electrodes, a stud-forming and transfer mechanism for forming successive studs from a length of wire and for transferring said studs to a swaging position, said mechanism comprising a feeder, a clamping device and a cutting die arranged along a wire feed path in succession, said feeder including feed jaws arranged to engage said wire and actuating means for moving said feed jaws through a forward stroke to advance a prescribed section of said wire through said cutting die, said feed jaws including a pair of jaws mounted for simultaneous movement along the wire feed path and for rotative movement toward and away from each other, roller means mounting said pair of feed jaws for movement along said wire feed path, spring means interposed between the feed jaws biasing same into an opened position, an operating member in roller engagement with one of said feed jaws for wire-engaging movement of same toward the other of said feed jaws and for allowing feeding movement of said feed jaws along the wire feed path, and feed stroke means operatively connected to at least one of said feed jaws for advancing and retracting same along said wire feed path, said clamping device including clamping jaws arranged to engage said wire in a clamping position and jaw-operating means for bringing said clamping devices into said clamping position after each forward feeding stroke of said feeding jaws, stud-transfer means movable transversely of said wire feed path to said swaging position and including transfer jaws mounted for movement toward and away from each other and for reciprocal movement along a transfer path transverse to said wire feed path and positioned to receive said prescribed section of wire, and operating means for bringing said transfer jaws in gripping engagement with said prescribed section of wire, a stationary cutter positioned to cooperate with said cutting die, and actuating means operable in timed relation to the operating means for said clamping device and said stud-transfer means for moving said cutting die relative to said stationary cutter to cut off said prescribed section of wire when supported by said transfer jaws, to move said feed jaws into feeding engagement with a length of wire and to activate said feed stroke means to move said jaws through a feeding stroke along said wire feed path, and means at said swaging position for acting on said studs at the cut ends thereof to swage same.

References Cited by the Examiner

UNITED STATES PATENTS

| | | | |
|---|---|---|---|
| 1,655,471 | 1/28 | Marcell | 83—277 |
| 1,696,484 | 12/28 | Hofmann | 163—2 |
| 1,706,729 | 3/29 | Gauthier | 10—12 |
| 1,894,526 | 1/33 | Wilcox | 29—34.4 |
| 1,897,970 | 2/33 | Hofmann et al. | 83—277 |
| 2,468,620 | 4/49 | Gilbert et al. | 83—277 |
| 2,542,864 | 2/51 | Friedman | 10—25 |
| 2,668,590 | 2/54 | De Witt et al. | 83—161 |
| 2,776,004 | 1/57 | Carlson | 83—153 |
| 2,806,934 | 9/57 | Andersson | 219—103 |

WILLIAM J. STEPHENSON, *Primary Examiner.*

CHARLES W. LANHAM, RICHARD H. EANES, JR., ARTHUR B. MILLER, *Examiners.*